United States Patent
Asahi

(10) Patent No.: US 10,178,268 B2
(45) Date of Patent: Jan. 8, 2019

(54) COMMUNICATION SYSTEM, SERVER DEVICE, CLIENT DEVICE, AND NON-TRANSITORY COMPUTER READABLE MEDIUM

(71) Applicant: FUJI XEROX CO., LTD., Tokyo (JP)

(72) Inventor: Nobushige Asahi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 345 days.

(21) Appl. No.: 15/057,356

(22) Filed: Mar. 1, 2016

(65) Prior Publication Data
US 2017/0019558 A1 Jan. 19, 2017

(30) Foreign Application Priority Data
Jul. 16, 2015 (JP) ................................. 2015-142151

(51) Int. Cl.
*H04N 1/32* (2006.01)
*G06F 17/21* (2006.01)

(52) U.S. Cl.
CPC ..... *H04N 1/32277* (2013.01); *H04N 1/32224* (2013.01); *H04N 1/32229* (2013.01); *G06F 17/214* (2013.01)

(58) Field of Classification Search
USPC .................................................. 382/232–233
See application file for complete search history.

(56) References Cited

U.S. PATENT DOCUMENTS

| | | | | | |
|---|---|---|---|---|---|
| 6,097,439 | A | * | 8/2000 | Goldberg | H04N 7/0885 348/465 |
| 7,624,337 | B2 | * | 11/2009 | Sull | G06F 17/30796 715/201 |
| 7,702,171 | B2 | * | 4/2010 | Murai | G06F 3/1462 382/164 |
| 8,612,521 | B2 | * | 12/2013 | Tonegawa | G06Q 10/107 707/608 |

(Continued)

FOREIGN PATENT DOCUMENTS

| | | |
|---|---|---|
| CN | 101558425 A | 10/2009 |
| CN | 102396180 A | 3/2012 |
| JP | 2006-285302 A | 10/2006 |

OTHER PUBLICATIONS

Oct. 9, 2018 Office Action issued in Chinese Patent Application No. 201610217328.8.

*Primary Examiner* — Ishrat I Sherali
(74) *Attorney, Agent, or Firm* — Oliff PLC

(57) ABSTRACT

A communication system includes a server device and a client device. The server device includes an encoding unit that encodes information about characters contained in a first image to generate an encoded image, a generation unit that generates a second image in which the generated encoded image is embedded at a position specified from a position of the characters on the first image in place of the characters, and a transmission unit that transmits the second image to the client device in response to a request for the first image from the client device. The client device includes an extraction unit that extracts the encoded image from the received (Continued)

second image, a decoding unit that decodes the extracted encoded image, and a replacement unit that replaces the encoded image on the second image with characters specified from decoded information to generate the first image.

7 Claims, 8 Drawing Sheets

(56) References Cited

U.S. PATENT DOCUMENTS

| | | | |
|---|---|---|---|
| 9,928,559 B2* | 3/2018 | Lahmi | G06T 1/0028 |
| 2010/0211883 A1* | 8/2010 | Lee | H04L 12/282 |
| | | | 715/740 |
| 2012/0020561 A1* | 1/2012 | Eshghi | G06K 9/00463 |
| | | | 382/177 |
| 2016/0035060 A1* | 2/2016 | Lahmi | G06T 1/0028 |
| | | | 382/100 |

* cited by examiner

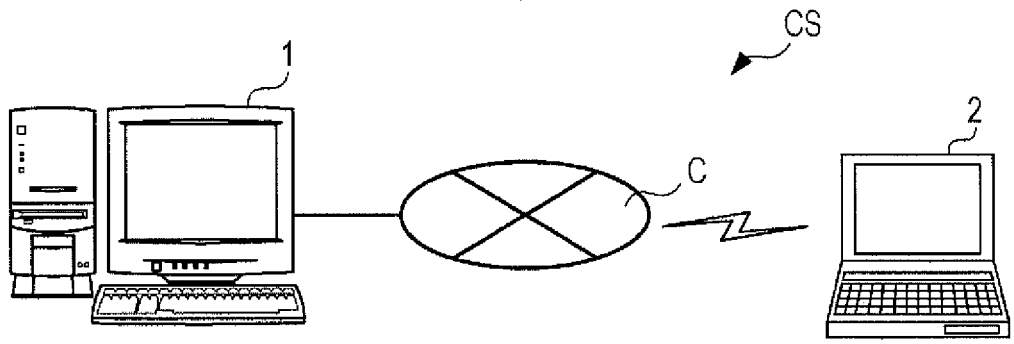
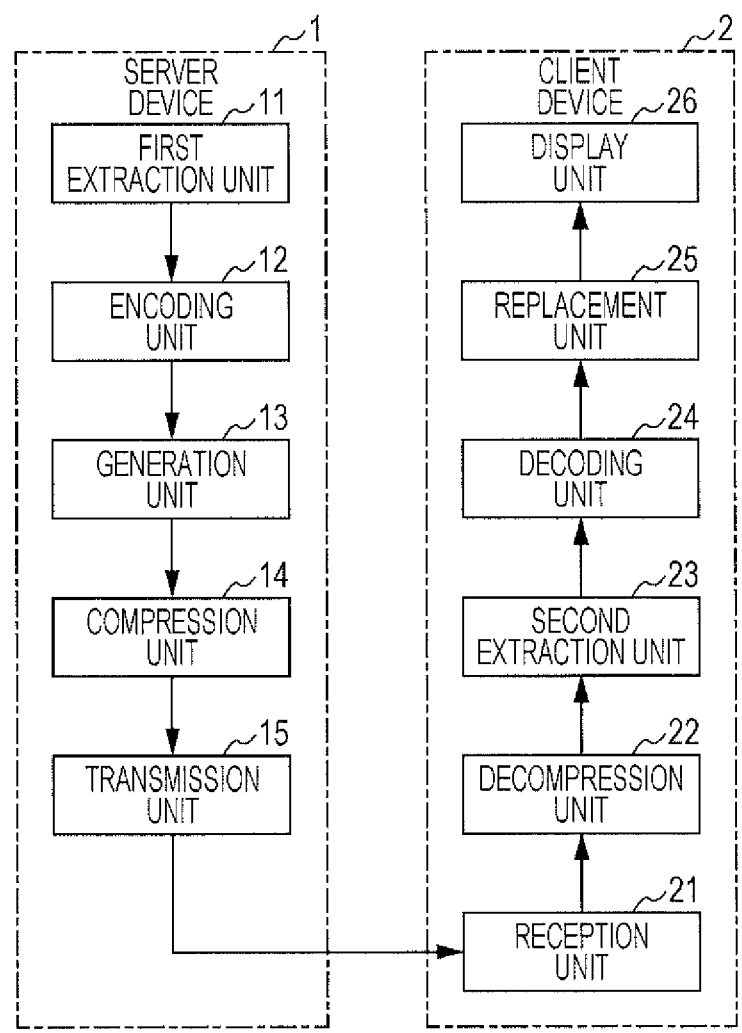

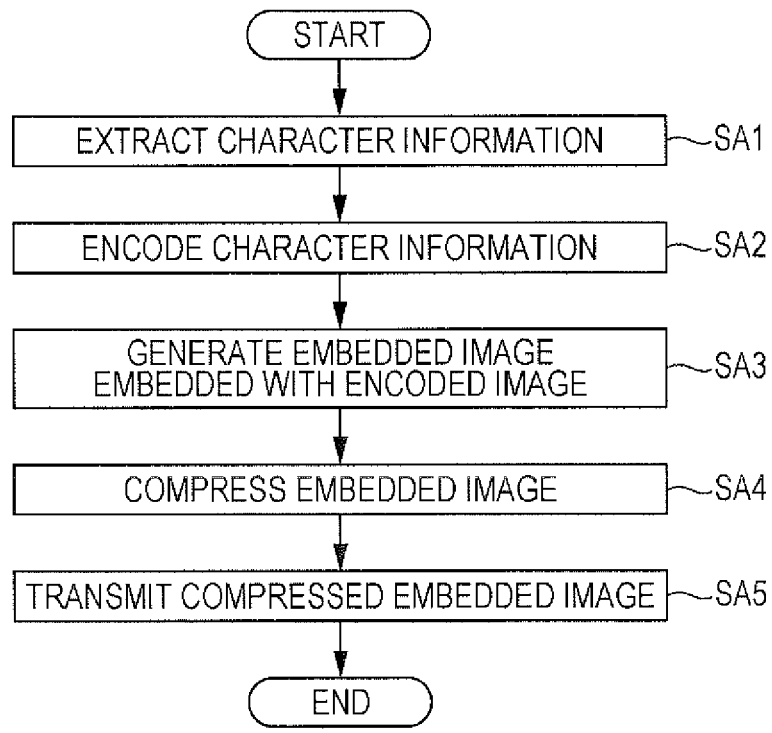

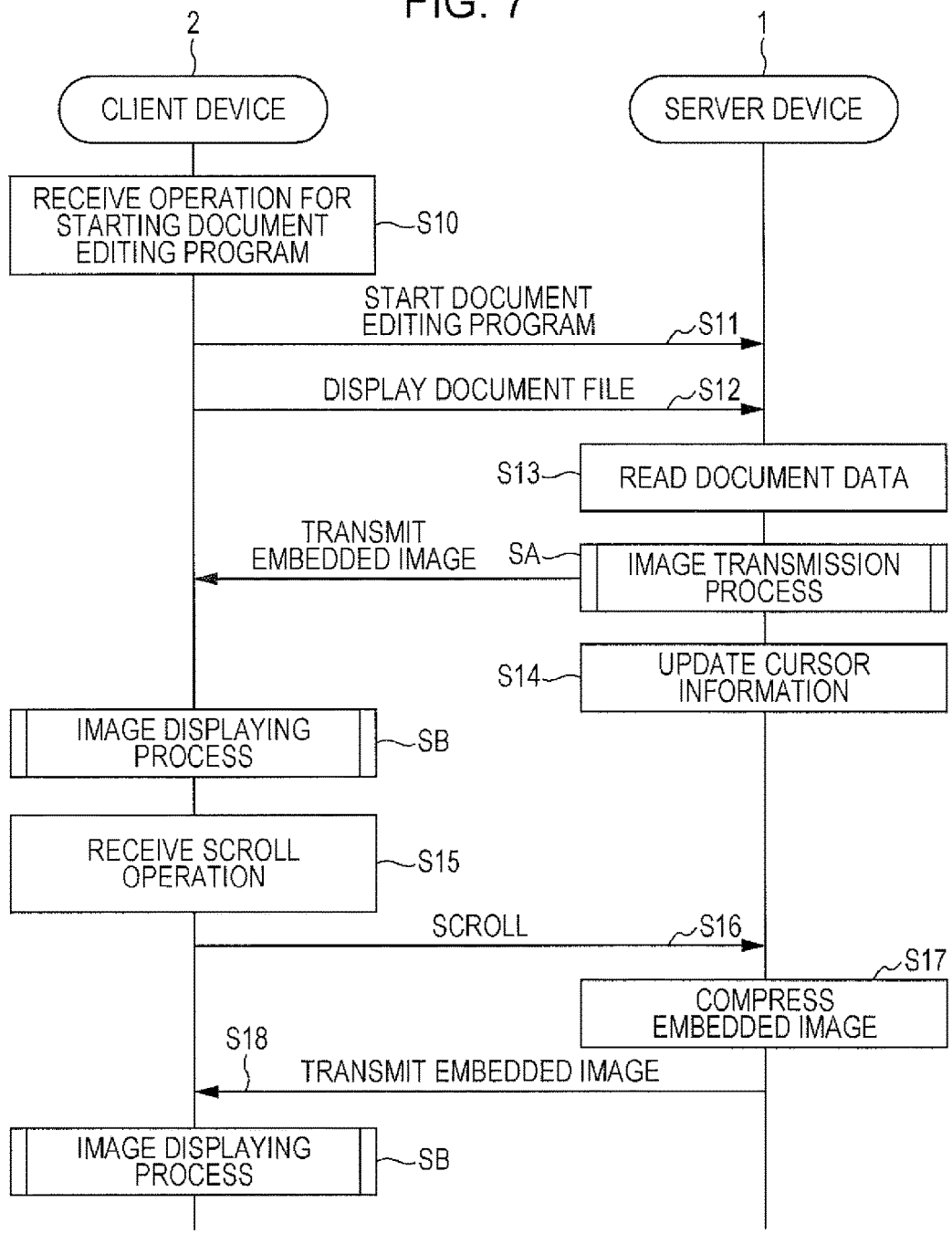

FIG. 8A

```
FT_New_Face   ( library, 'C:¥WINDOWS¥Fonts¥MS.TTF' , 0, &face ) ;
FT_Set_Char_Size    ( face, 0, 16 * 64, 300, 300 ) ;
FT_Load_Char ( face," I AM A CAT. ¥n" , FT_LOAD_RENDER) ;
FT_Load_Char ( face," I HAVE NO NAME YET. ¥n" , FT_LOAD_RENDER) ;
FT_Load_Char ( face," I HAVE NO IDEA" , FT_LOAD_RENDER) ;
FT_Load_Char ( face," WHERE I WAS BORN. ¥n" , FT_LOAD_RENDER) ;
FT_Load_Char ( face," I BARELY REMEMBER" , FT_LOAD_RENDER) ;
FT_Load_Char ( face," THAT I WAS MEOWING ¥n" , FT_LOAD_RENDER) ;
FT_Load_Char ( face," IN A DARK" , FT_LOAD_RENDER) ;
FT_Load_Char ( face," AND DAMP PLACE. ¥n" , FT_LOAD_RENDER) ;
FT_Load_Char ( face," HERE I SAW WHAT IS CALLED" , FT_LOAD_RENDER) ;
FT_Load_Char ( face," A HUMAN BEING FOR THE FIRST TIME. ¥n" , FT_LOAD_RENDER) ;
```

FIG. 8B

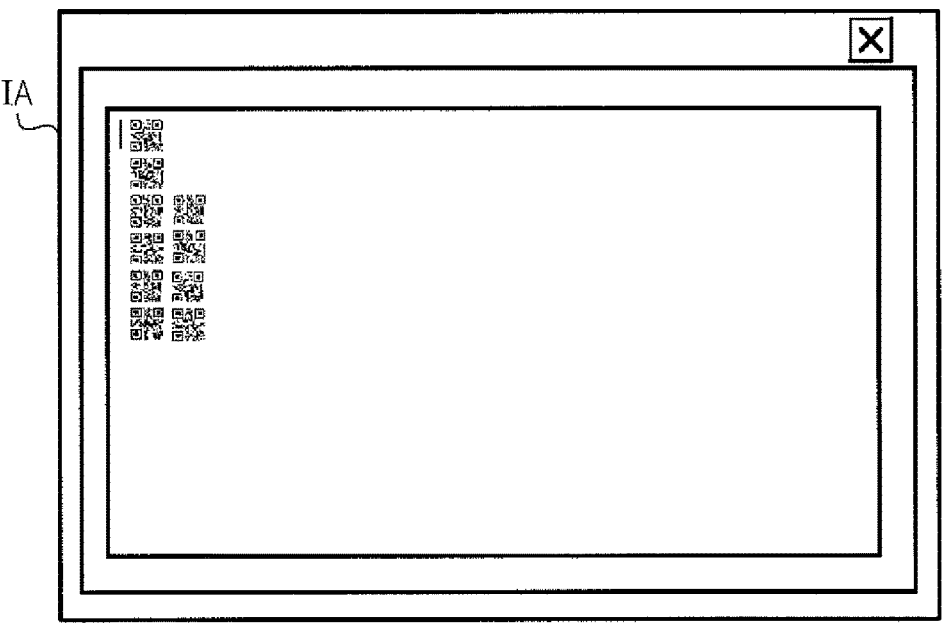

IA

COMMUNICATION SYSTEM, SERVER DEVICE, CLIENT DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-142151 filed Jul. 16, 2015.

BACKGROUND (i) Technical Field

The present invention relates to a communication system, a server device, a client device, and a non-transitory computer readable medium.

(ii) Related Art

There is known a communication system that compresses an image displayed on the screen of one computer to transmit the image to another computer.

SUMMARY

According to an aspect of the present invention, there is provided a communication system including a server device and a client device, in which the server device includes an encoding unit that encodes information about characters contained in a first image to generate an encoded image, a generation unit that generates a second image in which the encoded image generated by the encoding unit is embedded at a position specified from a position of the characters on the first image in place of the characters, and a transmission unit that transmits the second image to the client device in response to a request for the first image from the client device, and the client device includes an extraction unit that extracts the encoded image from the second image transmitted from the server device, a decoding unit that decodes the encoded image extracted by the extraction unit, and a replacement unit that replaces the encoded image on the second image with characters specified from information decoded by the decoding unit to generate the first image.

BRIEF DESCRIPTION OF THE DRAWINGS

An exemplary embodiment of the present invention will be described in detail based on the following figures, wherein:

FIG. 1 illustrates the overall configuration of a communication system;

FIG. 2 illustrates the functional configuration of the communication system;

FIG. 4 is a flowchart illustrating an image transmission process performed by the server device;

FIG. 5 illustrates an example of character information;

FIG. 7 is a sequence chart illustrating operation performed when a document file is to be viewed;

FIGS. 8A and 8B illustrate an example of an embedded image;

DETAILED DESCRIPTION

Figure 3:
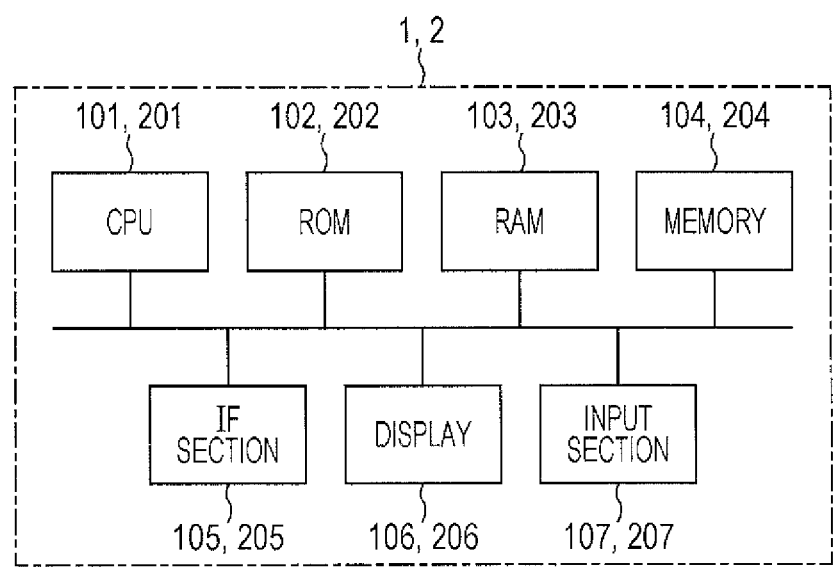
FIG. 3 illustrates the hardware configuration of a server device and a client device.

FIG. 1 illustrates the overall configuration of a communication system CS according to an exemplary embodiment of the present invention. The communication system CS includes a server device 1 and a client device 2. The communication system CS is a so-called thin-client system in the broad sense, in which the client device 2 performs minimum necessary processes and the server device 1 performs the remaining processes. Specifically, the communication system CS is a screen-transfer thin-client system, in which the server device 1 executes an operating system (OS) and an application program and transfers a bit-map image of a screen that represents the execution results to the client device 2. The client device 2 displays the bit-map image transferred from the server device 1 on the screen, and transmits to the server device 1 information (hereinafter referred to as "operation information") that indicates an operation that has been performed on the client device 2 via a keyboard or a mouse. The server device 1 and the client device 2 are connected to each other via a communication line C such as the Internet.

In the screen-transfer thin-client system, the amount of data to be transferred tends to be increased as the resolution of an image to be transferred becomes higher. In addition, the resolution of an image to be transferred is determined by the screen resolution of the server device 1. Therefore, in the case where the screen resolution of the server device 1 is lower than the screen resolution of the client device 2, the image is displayed with a resolution that is lower than the screen resolution of the client device 2.

FIG. 2 illustrates the functional configuration of the communication system CS according to the exemplary embodiment of the present invention. The server device 1 includes a first extraction unit 11, an encoding unit 12, a generation unit 13, a compression unit 14, and a transmission unit 15. The first extraction unit 11 extracts information (hereinafter referred to as "character information") about characters contained in a first image from the first image or information that indicates the first image. The encoding unit 12 encodes the character information to generate an encoded image. The generation unit 13 generates a second image in which the encoded image generated by the encoding unit 12 is embedded at a position specified from the position of the characters on the first image in place of the characters. The compression unit 14 compresses the second image generated by the generation unit 13. The transmission unit 15 transmits the second image compressed by the compression unit 14 to the client device 2 in response to a request for the first image from the client device 2.

The client device 2 includes a reception unit 21, a decompression unit 22, a second extraction unit 23, a decoding unit 24, a replacement unit 25, and a display unit 26. The reception unit 21 receives the second image from the server device 1. The decompression unit 22 decompresses the second image received by the reception unit 21. The second extraction unit 23 extracts the encoded image from the second image decompressed by the decompression unit 22. The decoding unit 24 decodes the encoded image extracted by the second extraction unit 23. The replacement unit 25 replaces the encoded image on the second image with characters specified from character information decoded by the decoding unit 24 to generate the first image. The display unit 26 displays the first image generated by the replacement unit 25.

FIG. 3 illustrates the hardware configuration of the server device 1 and the client device 2. In FIG. 3, the numerals indicated in the parentheses represent symbols for the hardware configuration of the client device 2. The server device 1 is a computer that includes a central processing unit (CPU) 101, a read-only memory (ROM) 102, a random-access memory (RAM) 103, a memory 104, an interface (IF) section 105, a display 106, and an input section 107. The CPU 101 is a control device that executes a program to control various sections of the server device 1. The CPU 101 reads a program stored in the ROM 102 and the memory 104, and executes the program using the RAM 103 as the working area. The ROM 102 is a non-volatile storage device that stores various programs and data. The RAM 103 is a volatile storage device that stores data.

The memory 104 is a non-volatile auxiliary storage device that stores various programs and data. The IF section 105 is a unit that transmits and receives data, and communicates with the client device 2 via the communication line C.

The display section 106 is a unit that displays information, e.g. a liquid-crystal display. The input section 107 is a device that receives an input by the user, and includes a keyboard, a mouse, various buttons, and so forth. The client device 2 has a hardware configuration similar to that of the server device 1.

In FIG. 3, the CPU 101 which executes a server control program (e.g. the OS of the server device 1) for controlling various sections of the server device 1 is an example of the first extraction unit 11, the encoding unit 12, the generation unit 13, and the compression unit 14. The IF section 105 which is controlled by the CPU 101 which executes the server control program is an example of the transmission unit 15.

In FIG. 3, in addition, the IF section 205 which is controlled by the CPU 201 which executes a terminal control program (e.g. the OS of the client device 2) for controlling various sections of the client device 2 is an example of the reception unit 21. The CPU 201 which executes the terminal control program is an example of the decompression unit 22, the second extraction unit 23, the decoding unit 24, and the replacement unit 25. The display 206 which is controlled by the CPU 201 which executes an application program (hereinafter referred to as a "thin-client program") for achieving a thin-client system is an example of the display unit 26.

FIG. 4 is a flowchart illustrating operation (an image transmission process) of the server device 1 in the communication system CS. The process illustrated in FIG. 4 is started when the server device 1 has started an application program (hereinafter referred to as a "document editing program") for preparing, editing, saving, and viewing a document such as a text editor, for example, and the document editing program has read a document file. In the following description, the document editing program and the server control program are occasionally described as the subject of operation. The description means that the CPU 101 which executes the programs performs the process in cooperation with other hardware elements. When document data are read, the document editing program outputs an instruction (hereinafter referred to as a "character drawing instruction") for drawing characters indicated by the document data to the server control program. In the character drawing instruction, character information about characters to be drawn on the screen is described in a data description language or with a data structure.

In step SA1, the server control program extracts character information from the character drawing instruction. Specifically, the server control program extracts, from the character drawing instruction, characters to be drawn, the font of the characters, the size of the characters, the position (coordinate) of the characters, the style of the characters (such as bold-faced, underlined, and italicized), and the rotational angle of the characters as the character information. The server control program stores the extracted character information in the RAM 103.

FIG. 5 illustrates an example of the character information. In the example, the character information indicates that the characters are "Hello", the font is Gothic, the size is "10", the coordinate is (0, 0), the style is bold-faced, and the rotational angle is 0 degrees.

FIG. 4 is referenced again. In step SA2, the server control program encodes the character information to generate an encoded image. The character information is encoded in order to reduce the amount of data to be transferred from the server device 1 to the client device 2. The server control program encodes the character information to generate a two-dimensional code such as a QR code (registered trademark), for example. The character information is encoded for each block of characters indicated by the character information described in the character drawing instruction, for example. In step SA3, the server control program generates an embedded image (an example of the second image) in which the encoded image is embedded in place of the characters specified from the character information. Specifically, the server control program embeds the encoded image at a position (i.e. the position at which the characters should originally be displayed) specified from the character information on the basis of which the encoded image has been prepared. The server control program generates an embedded image with the screen resolution of the server device 1, for example.

In step SA4, the server control program compresses the embedded image. The server control program compresses the embedded image using an image compression format known in the art such as JPEG or GIF. As discussed above, the embedded image has been embedded with the encoded image in place of a block of characters. In step SA5, the server control program transmits the compressed embedded image to the client device 2. Through the process described above, the server device 1 transmits the embedded image to the client device 2 rather than transmitting to the client device 2 an image (hereinafter referred to as a "character drawn image") in which characters are drawn in accordance with a character drawing instruction.

Figure 6:
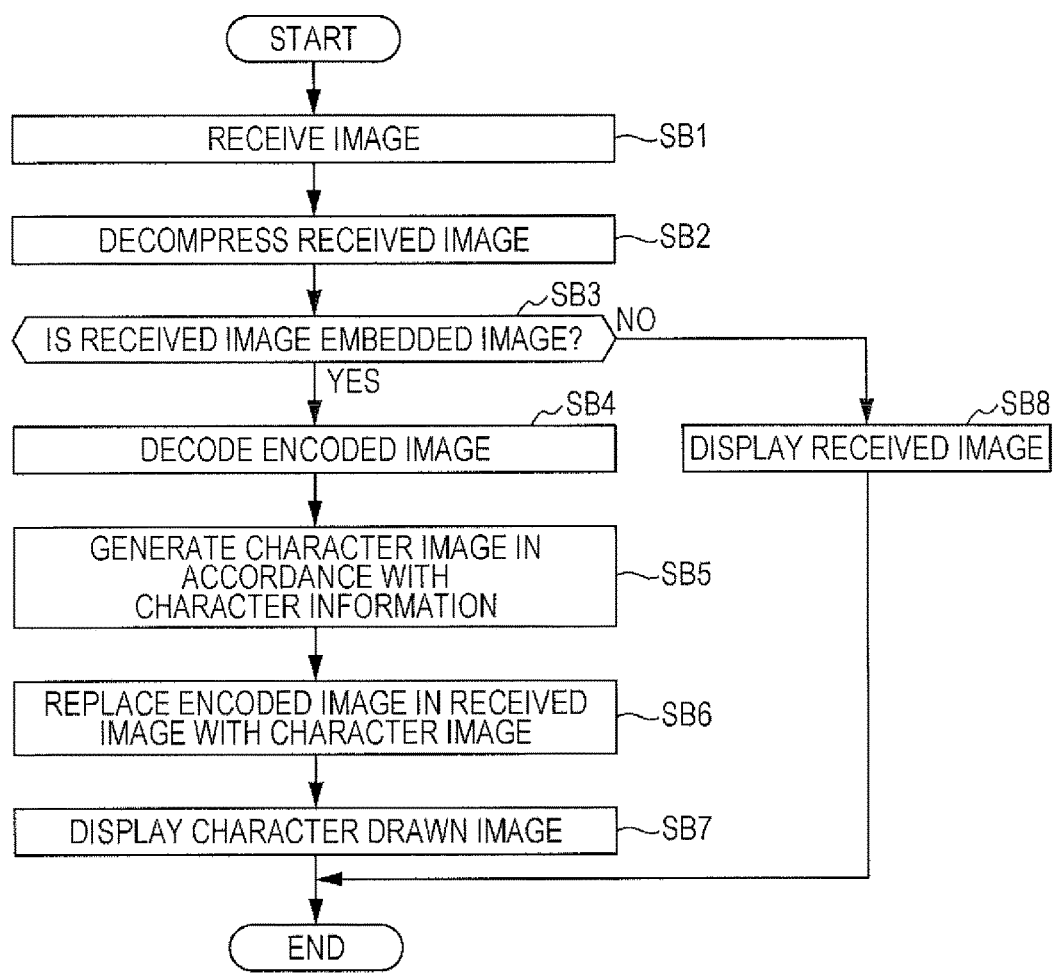
FIG. 6 is a flowchart illustrating an image displaying process performed by the client device.

FIG. 6 is a flowchart illustrating operation (an image displaying process) of the client device 2 in the communication system CS. In the following description, the thin-client program and the terminal control program are occasionally described as the subject of operation. The description means that the CPU 201 which executes the programs performs the process in cooperation with other hardware elements. In step SB1, the terminal control program receives the compressed image from the server device 1. In step SB2, the terminal control program decompresses the image (hereinafter referred to as a "received image") received from the server device 1. The terminal control program stores the decompressed received image in the RAM 203.

In step SB3, the terminal control program determines whether or not the received image is an embedded image.

Specifically, the terminal control program performs pattern matching to search for a characteristic point of an encoded image to extract an encoded image from the received image. In the case where an encoded image is extracted, the terminal control program determines that the received image is an embedded image. In the case where it is determined that the received image is an embedded image (SB3: YES), the terminal control program proceeds to step SB4. In the case where it is not determined that the received image is an embedded image (SB3: NO), the terminal control program outputs the received image to the thin-client program, and proceeds to step SB8.

In step SB4, the terminal control program decodes the encoded image extracted in step SB3 to acquire character information. The terminal control program stores the character information in the RAM 203. In step SB5, the terminal control program generates an image (hereinafter referred to as a "character image") that represents characters in accordance with the character information. For example, in the case where the character information illustrated in FIG. 5 is acquired, a character image that represents a character string "Hello" written in Gothic font, with a size "10", bold-faced, and at a rotational angle of 0 degrees is generated. Font data for characters to be displayed on the display 206 have been stored in the memory 204 in advance, and the terminal control program generates a character image with reference to the font data. The terminal control program generates a character image with the screen resolution of the client device 2 (i.e. the highest resolution that is displayable on the display 206 of the client device 2).

In step SB6, the terminal control program replaces the encoded image on the embedded image with the character image. Specifically, the terminal control program embeds the character image generated in accordance with the character information stored in the RAM 203 at a coordinate specified from the character information. A character drawn image is generated in the client device 2 by replacing the encoded image on the received image with the character image. The terminal control program outputs the character drawn image to the thin-client program. In step SB7, the thin-client program displays the character drawn image on the display 206. As discussed above, the character image on the character drawn image is generated with the screen resolution of the client device 2. In step SB8, the thin-client program displays the received image on the display 206.

FIG. 7 is a sequence chart illustrating operation of the communication system CS performed when a document file is to be viewed. The process illustrated in FIG. 7 is started with the server device 1 and the client device 2 connected to each other using the thin-client system. In the sequence chart described below, operations received by the client device 2 are all performed by a user operating the input section 207.

In step S10, the thin-client program of the client device 2 receives an operation for starting the document editing program. In step S11, the thin-client program transmits information on the operation for starting the document editing program to the server device 1. Upon receiving the operation information, the server control program of the server device 1 starts the document editing program.

In step S12, the thin-client program transmits information on an operation for displaying a document file to the server device 1. The operation information is transmitted to the server device 1 when an operation for opening a document file is received. In step S13, the document editing program reads from the memory 104 a document file specified in the operation information transmitted from the client device 2. When the document file is read by the document editing program, the server control program performs the image transmission process illustrated in FIG. 4. When the image transmission process is performed, the embedded image is transmitted from the server device 1 to the client device 2. In the image transmission process, the server control program generates an embedded image for the entire document file, compresses a predetermined region (e.g. the first page of the document file) of the embedded image, and transmits the image to the client device 2, for example. When the image is received from the server device 1, the CPU 201 of the client device 2 performs the image displaying process illustrated in FIG. 6.

FIGS. 8A and 8B illustrate an example of the embedded image generated in the image transmission process. In the example, the document editing program outputs a character drawing instruction illustrated in FIG. 8A, and the server control program generates an embedded image that matches the document editing program. In FIG. 8A, character strings "I am a cat.", "I have no name yet.", . . . , and "a human being for the first time." represent blocks of the characters indicated by the character information. The server control program encodes the character information for each block of characters to generate a QR code to generate an embedded image IA illustrated in FIG. 8B.

Figure 9:
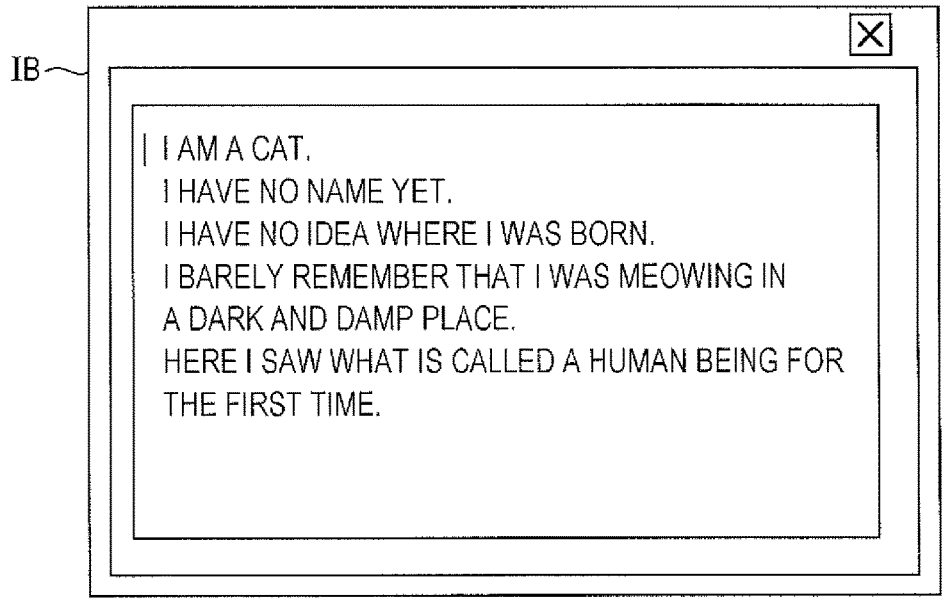
FIG. 9 illustrates an example of a character drawn image.

FIG. 9 illustrates an example of the character drawn image displayed in the image displaying process. FIG. 9 illustrates a character drawn image IB displayed when the embedded image illustrated in FIG. 8B is transmitted by the server device 1. In the character drawn image IB, character strings "I am a cat.", "I have no name yet.", and "a human being for the first time." are drawn by decoding the QR codes on the embedded image illustrated in FIG. 8B.

FIG. 7 is referenced again. In step S14, the document editing program updates information (hereinafter referred to as "cursor information") that indicates the current position of a cursor. The cursor information is information managed by the document editing program in order to specify a location of editing when a document is to be edited, and is stored in the RAM 103. The document editing program stores, as the cursor information, a predetermined position (e.g. the upper left position of the document being displayed) or a position specified by the user.

In step S15, the thin-client program receives a scroll operation performed for the image displayed on the display 206. In step S16, the thin-client program transmits information on the scroll operation to the server device 1. The operation information indicates the direction of the scroll and the amount of the scroll, for example. In step S17, the server control program compresses a region of the embedded image generated in the image transmission process discussed above after being scrolled in accordance with the scroll operation information. In step S18, the server control program transmits the compressed embedded image to the client device 2. When the image is received from the server device 1, the CPU 201 of the client device 2 performs the image displaying process illustrated in FIG. 6 again. Consequently, an image that matches the scroll operation is displayed on the display 206.

Figure 10:
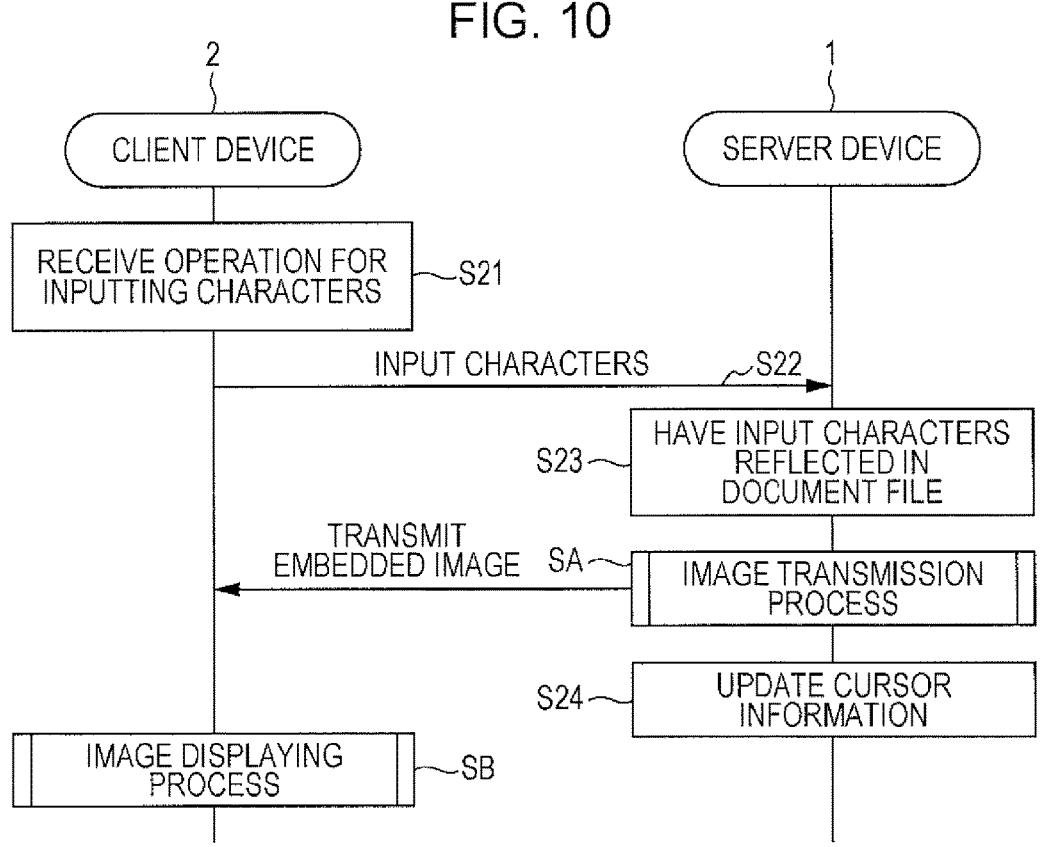
FIG. 10 is a sequence chart illustrating operation performed when a document is to be edited.

FIG. 10 is a sequence chart illustrating operation of the communication system CS performed when a document is to be edited. The process illustrated in FIG. 10 is started with the client device 2 viewing a document file stored in the server device 1 using the thin-client system. In step S21, the thin-client program receives an operation for inputting characters. In step S22, the thin-client program transmits information on the operation for inputting characters to the server device 1. The information on the operation for inputting characters includes the input characters or the content of the operation (e.g. what keys on the keyboard have been depressed).

In step S23, the document editing program updates the content of the document file in accordance with the information on the operation for inputting characters. Specifically, the document editing program reads the cursor information from the RAM 103, and has the information on the operation for inputting characters reflected at a position in the document file specified in accordance with the cursor information. When the content of the document file is changed by the document editing program, the server control program performs the image transmission process illustrated in FIG. 4 again. In the image transmission process, the server control program generates an embedded image for a region of the document file in which characters have been input, compresses the embedded image, and transmits the image to the client device 2, for example. When the image is received from the server device 1, the CPU 201 of the client device 2 performs the image displaying process illustrated in FIG. 6. Consequently, an image that reflects the operation for inputting characters is displayed on the display 206.

In step S24, the document editing program updates the cursor information. Specifically, the document editing program changes the cursor information to the position at the end of the characters input in step S22.

The present invention is not limited to the exemplary embodiment described above, and a variety of modifications may be made. Some modifications will be described below. The modifications described below may be used in combination of two or more.

The encoded image is not limited to a QR code. The encoded image may be any image that indicates encoded character information, and may be any other two-dimensional code such as Portable Data File (PDF) 417, a Communication Platform (CP) code, and High Capacity Color Barcode (HCCB), for example. The encoded image may also be a one-dimensional code.

Figure 11:
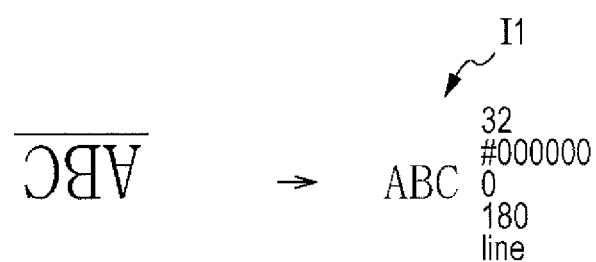
FIG. 11 illustrates an encoded image according to a modification.

FIG. 11 illustrates an encoded image according to a modification. In FIG. 11, an encoded image I1 is generated from underlined characters "ABC" written in Mincho font, with a size "32", in black color, at a position of "0", and at a rotational angle of 180 degrees. In the encoded image I1, rubies attached to the right side of the characters "ABC" written in Mincho font indicates the font size, the color, the position, the rotational angle, and the style of the characters.

The resolution of the character image is not limited to the resolution used in the exemplary embodiment. The terminal control program may generate a character image with a resolution that is lower than the screen resolution of the client device 2. For example, the terminal control program may generate a character image with a predetermined resolution (e.g. a resolution specified by the user).

The processes performed in the communication system CS are not limited to the processes described in relation to the exemplary embodiment. In the image transmission process, the server control program may not necessarily generate an embedded image for the entire document file. The server control program may generate an embedded image for a part of a document file (e.g. for a portion of the document file to be transmitted to the client device 2). In this case, in step S17, the server control program generates an embedded image for a portion of the document file after being scrolled, and compresses the embedded image.

The character information may not necessarily be extracted from a character drawing instruction. For example, the server control program may generate a character drawn image in accordance with a character drawing instruction and analyze the character drawn image to extract character information.

The encoded image may not necessarily be embedded at the position at which the characters should originally be displayed. The encoded image may be embedded at another position as long as the position of the characters on the character drawn image and the position of the encoded image in the embedded image make one-to-one correspondence.

The server control program may not necessarily compress the image. An uncompressed image may be transferred from the server device 1 to the client device 2. Also in this case, the amount of data to be transferred is reduced in a situation in which the resolution of the character image is higher than the resolution of the received image compared to a case where an image with the resolution of the character image is transferred.

The image transmitted in the communication system CS is not limited to an image in which only characters are indicated. For example, an image in which characters and a graphic image (still image) are arranged side by side or an image in which characters are indicated on a graphic image may be transferred from the server device 1 to the client device 2. Also in this case, the server device 1 and the client device 2 perform the processes described in relation to the exemplary embodiment on the characters contained in the image. In this case, the embedded image contains the graphic image and an encoded image.

The processes illustrated in FIGS. 4, 6, 7, and 10 may be performed by executing programs that are different from the programs discussed above. For example, a part of the operation performed by the server control program may be performed by the document editing program. Meanwhile, a part of the operation performed by the terminal control program may be performed by the thin-client program.

The character information is not limited to that described in relation to the exemplary embodiment. The character information may be any information that indicates characters to be drawn in accordance with a character drawing instruction and at least one of the font, the size, the position, the style, and the rotational angle of the characters to be drawn in accordance with the character drawing instruction. For example, the character information may indicate the color of the characters in addition to the information described in relation to the exemplary embodiment.

The information that indicates the position of characters may not necessarily be encoded. In this case, in the case where it is determined in step SB3 that the received image is an embedded image (SB3: YES), the terminal control program stores the position of the encoded image on the received image in the RAM 203. Then, in step SB6, the terminal control program embeds a character image generated on the basis of the encoded image at the position of the encoded image.

The information that indicates the size of characters may not necessarily be encoded. For example, the size of the characters specified from the encoded image may be indicated by the size of the encoded image itself. Specifically, in step SA3, the server control program may embed an encoded image of a smaller size as the size of the characters is smaller, and may embed an encoded image of a larger size as the size of the characters is larger. In this case, in step SB5, the terminal control program generates a character image of a size that matches the size of the encoded image.

In the exemplary embodiment, the server control program and the document editing program executed by the server device 1 and the terminal control program and the thin-client program executed by the client device 2 may be provided as stored in a computer readable recording medium such as a magnetic recording medium (such as a magnetic tape and a magnetic disk (such as a hard disk drive (HDD) and a flexible disk (FD))), an optical recording medium (such as an optical disk (such as a compact disk (CD) and a digital versatile disk (DVD))), a magneto-optical recording medium, and a semiconductor memory (such as a flash ROM). Alternatively, such programs may be downloaded by way of a network such as the Internet.

The configuration of the server device 1 and the client device 2 is not limited to the configuration described in relation to the exemplary embodiment. For example, the client device 2 may be a tablet terminal that includes a touch screen.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device comprising:
 a processor programmed to
  encode character information, contained in a first image in which characters are drawn in accordance with a character drawing instruction, for each block of characters to generate an encoded image for each block,
  generate an embedded second image in which each encoded image is embedded at each position specified from the character information in place of each block of characters, the embedded second image being generated with a resolution of the device, and
  in response to a request for the first image from an other device, transmit the embedded second image and not the first image to the other device such that the other device generates the first image based on the embedded second image with the characters being drawn with a resolution corresponding to a resolution of the other device.

2. The device according to claim 1, wherein
 the other device replaces each encoded image on the embedded second image with the characters with the resolution corresponding to the resolution of the other device.

3. The device according to claim 2, wherein
 the resolution corresponding to the resolution of the other device is a highest resolution displayable on a display of the other device.

4. The device according to claim 1, wherein
 the processor is further programmed to compress the embedded second image and transmit the compressed second image to the other device, and
 the other device decompresses the transmitted second image, and extracts each encoded image from the decompressed second image.

5. The device according to claim 1, wherein
 the character information contained in the first image indicates at least one of a font, a size, a position, a style, and a rotational angle of the characters contained in the first image.

6. A non-transitory computer readable medium storing a program causing a computer to execute:
 encoding character information, contained in a first image in which characters are drawn in accordance with a character drawing instruction, for each block of characters to generate an encoded image for each block;
 generating an embedded second image in which each encoded image is embedded at each position specified from the character information in place of each block of characters, the embedded second image being generated with a resolution of the computer; and
 in response to a request for the first image from an other device, transmitting the embedded second image and not the first image to the other device such that the other device generates the first image based on the embedded second image with the characters being drawn with a resolution corresponding to a resolution of the other device.

7. The device according to claim 1, wherein
 the encoded image includes a QR code, and the embedded second image includes the QR code.

* * * * *